W. D. WILLIAMS.
RAIL JOINT CLAMP.
APPLICATION FILED JAN. 16, 1917.
1,251,605.
Patented Jan. 1, 1918.
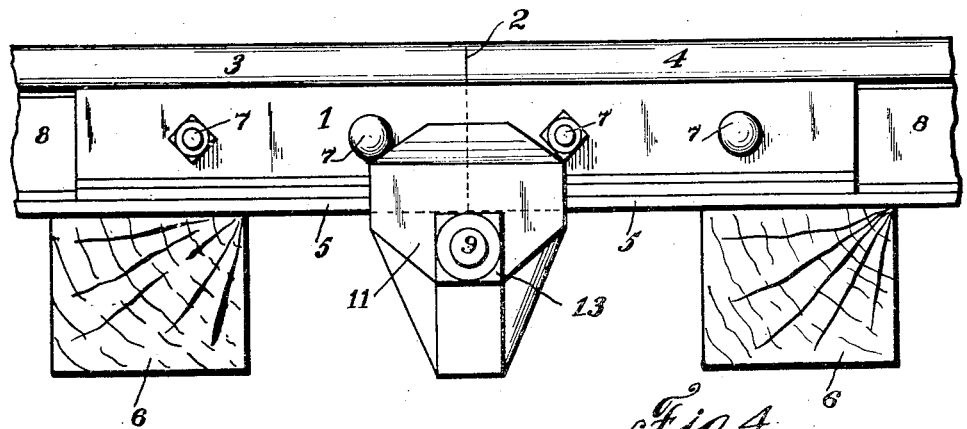
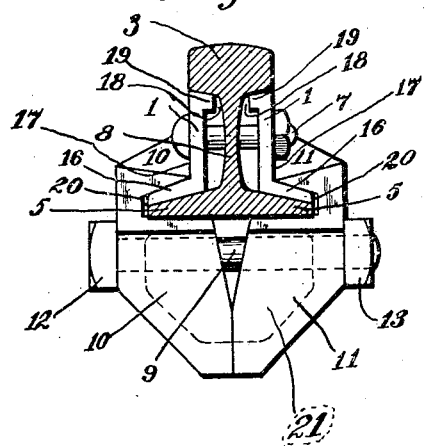
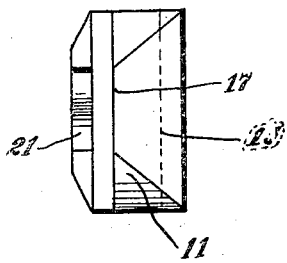
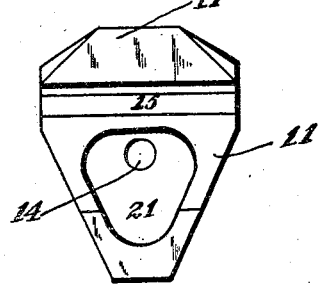
Inventor:
Willis D. Williams,
By
Hugh H. Wagner
Atty.

UNITED STATES PATENT OFFICE.

WILLIS D. WILLIAMS, OF ST. LOUIS, MISSOURI, ASSIGNOR TO WILLIAMS BOLTLESS RAIL JOINT MANUFACTURING COMPANY, OF PRESCOTT, ARIZONA, A CORPORATION OF ARIZONA.

RAIL-JOINT CLAMP.

1,251,605.  Specification of Letters Patent.  Patented Jan. 1, 1918.

Application filed January 16, 1917. Serial No. 142,692.

*To all whom it may concern:*

Be it known that I, WILLIS D. WILLIAMS, a citizen of the United States, residing at the city of St. Louis, in the State of Missouri, have invented certain new and useful Improvements in Rail-Joint Clamps, of which the following is a specification.

This invention provides not only a support for a rail-joint from the roadbed, but also a clamp therefor adapted to relieve the strain on the ordinary rail-joint bolts.

In the accompanying drawings forming part of this specification and in which like numbers of reference denote like parts wherever they occur, Figure 1 is a side elevation;

Fig. 2 is a sectional view through the rail and an end elevation of the clamp or support;

Fig. 3 is an elevational view of the inside of one of the clamping members, both being substantially identical; and Fig. 4 is a plan view of the same.

The angle irons 1 overlap the joint 2 between the abutting rails 3 and 4, and the bases 5 of the rails rest upon the ties 6. Ordinary bolts 7 bolt the angle irons 1 to the web 8 of the rails, thus forming a tight joint; but vibration and inevitable wear and tear exert a prodigious strain upon the said bolts, sometimes stripping the threads and sometimes stretching the metal.

This invention serves not only to support the abutting ends of the rails from the roadbed at the rail joint, and in that manner and to that extent strengthens the joint, but it also serves to clamp the angle irons 1 more closely to the web 8 of the rails and thus to relieve the strain on the bolts 7. Besides this, the bolt 9 that draws the opposing members 10 and 11 toward each other into engagement with the angle irons 1 is approximately one and one-half inches in diameter and considerably larger and heavier than any one of the bolts 7. It is, therefore, much stronger and better adapted to stand the strain at the joint than the bolts 7 in their several positions. The bolt 9 is provided with a head 12 and nut 13, and passes through a hole 14 in the members 10 and 11. The groove 15 in each of the members 10 and 11 fits over the flange 16 of the angle iron 1 adjacent to it, and also over the base 5 of the rail, while the lip 17 bears upon the upper surface of the flange 16 of the angle iron 1, so that the members 10 and 11 constitute an opposing pair of jaws which, when nut 13 is threaded home on bolt 9, tightly grasp and unite flanges 16 of angle irons 1 to the bases 5 of a pair of rails.

To allow for the usual wear and tear, clearance 18 is left between the lip 19 at the upper part of each angle iron 1 and the web 8 of the rail, and for the same purpose clearance 20 is left in the jaws 10 and 11.

To reduce the weight of metal, the jaws 10 and 11 may be dished or cut away at 21 and any other suitable places.

I hereby reserve the benefit of all changes in form, arrangement, order, or use of parts, as it is evident that many minor changes may be made therein without departing from the spirit of this invention.

I claim:

1. In a rail joint, the combination with a pair of spaced sleepers, of alining rail sections supported on said sleepers and having their abutting ends disposed in a plane medially of the space therebetween, angle plates secured at opposite sides of the web of the rail, and a member supported on the roadbed between said sleepers and underlying the joint to form a seat therefor.

2. In a rail joint, the combination with a pair of spaced sleepers, of alining rail sections supported on said sleepers and having their abutting ends disposed in a plane medially of the space therebetween, angle plates secured at opposite sides of the web of the rail, and a clamping member engaging the opposite sides of the joint and depending therefrom into engagement with the roadbed between said sleepers.

3. In a rail joint, the combination with a pair of spaced sleepers, of alining rail sections supported on said sleepers and having their abutting ends disposed in a plane medially of the space therebetween, angle plates secured at opposite sides of the web of the rail and spanning said sleepers, and a clamping member engaging the opposite sides of the joint and depending therefrom into engagement with the roadbed between said sleepers.

4. In a rail joint, the combination with a pair of spaced sleepers, of alining rail sections supported on said sleepers and having their abutting ends disposed in a plane medially of the space therebetween, angle plates secured at opposite sides of the web of the rail, and a clamping member engaging said angle plates and depending therefrom into engagement with the roadbed between said sleepers.

5. In a rail joint, the combination with spaced sleepers, of alining rail sections supported on said sleepers and having their abutting ends disposed in a plane medially of the space therebetween, a pair of angle plates formed with laterally-extending flanges adapted to engage the adjacent base flange of the rail, means for securing the angle plates at opposite sides of the web of the rail, and a clamping member engaging said angle plates and depending therefrom into engagement with the roadbed between said sleepers.

6. In a rail joint, the combination with spaced sleepers, of alining rail sections supported on said sleepers and having their abutting ends disposed in a plane medially of the space therebetween, a pair of angle plates formed with laterally extending flanges adapted to engage the adjacent base flange of the rail, means for securing said angle plates at opposite sides of the web of the rail, and a clamping member positioned on the roadbed intermediate said sleepers and rising therefrom into engagement with the rail joint to form a seat therefor, said clamping member being provided with jaws adapted to engage the flange portion of said angle plates and to extend therebeyond into engagement with the walls of said plates.

7. In a rail joint, the combination with spaced sleepers of alining rail sections supported on said sleepers and having their abutting ends disposed in a plane medially of the space therebetween, angle plates secured at opposite sides of the web of the rail and spanning said sleepers, and a clamping member engaging said plates and depending therefrom into the plane of the lower face of said sleepers and into engagement with the roadbed.

In testimony whereof I hereunto affix my signature.

WILLIS D. WILLIAMS.

Copies of this patent may be obtained for five cents each, by addressing the "Commissioner of Patents, Washington, D. C."